United States Patent Office 2,832,497
Patented Apr. 29, 1958

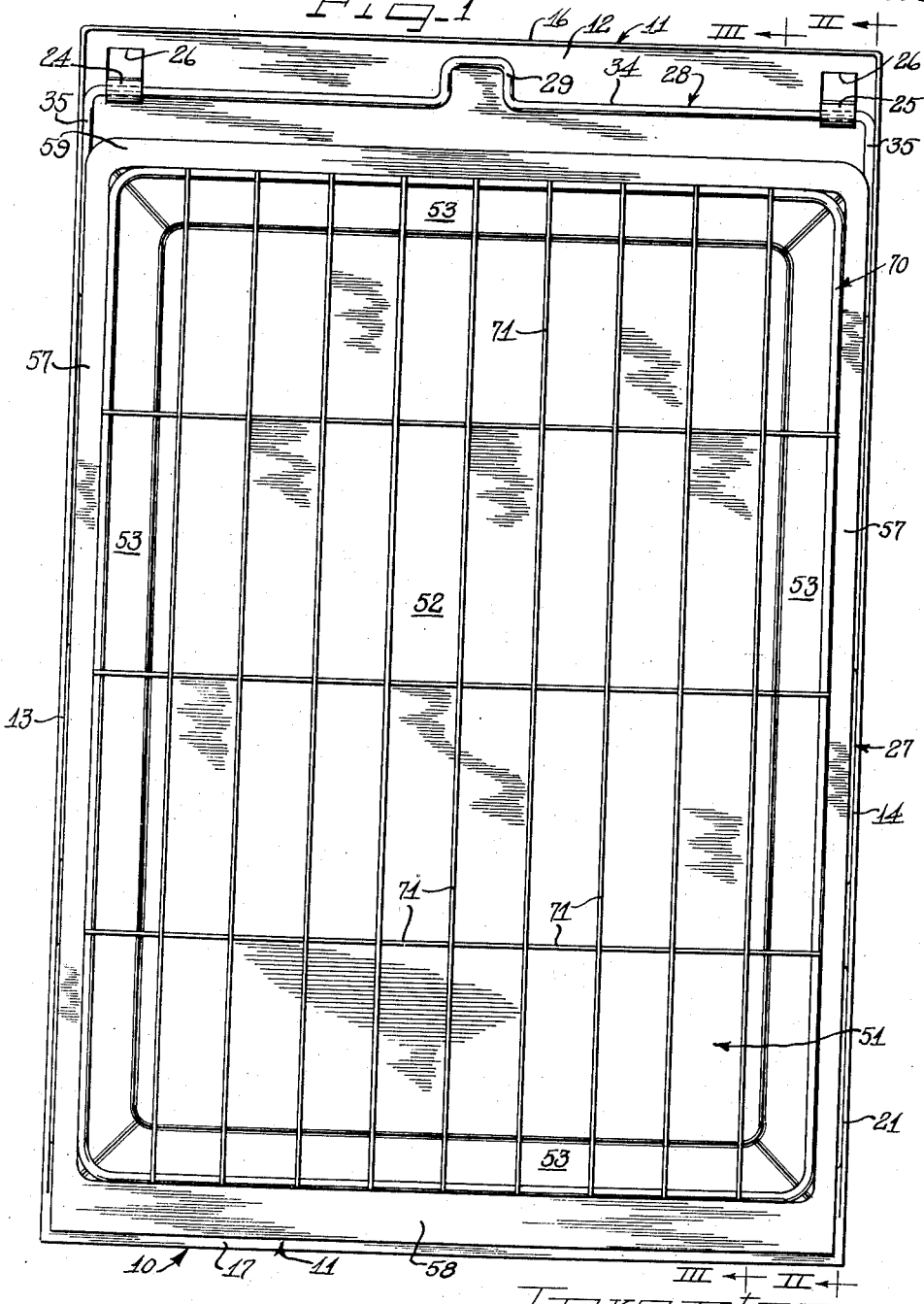

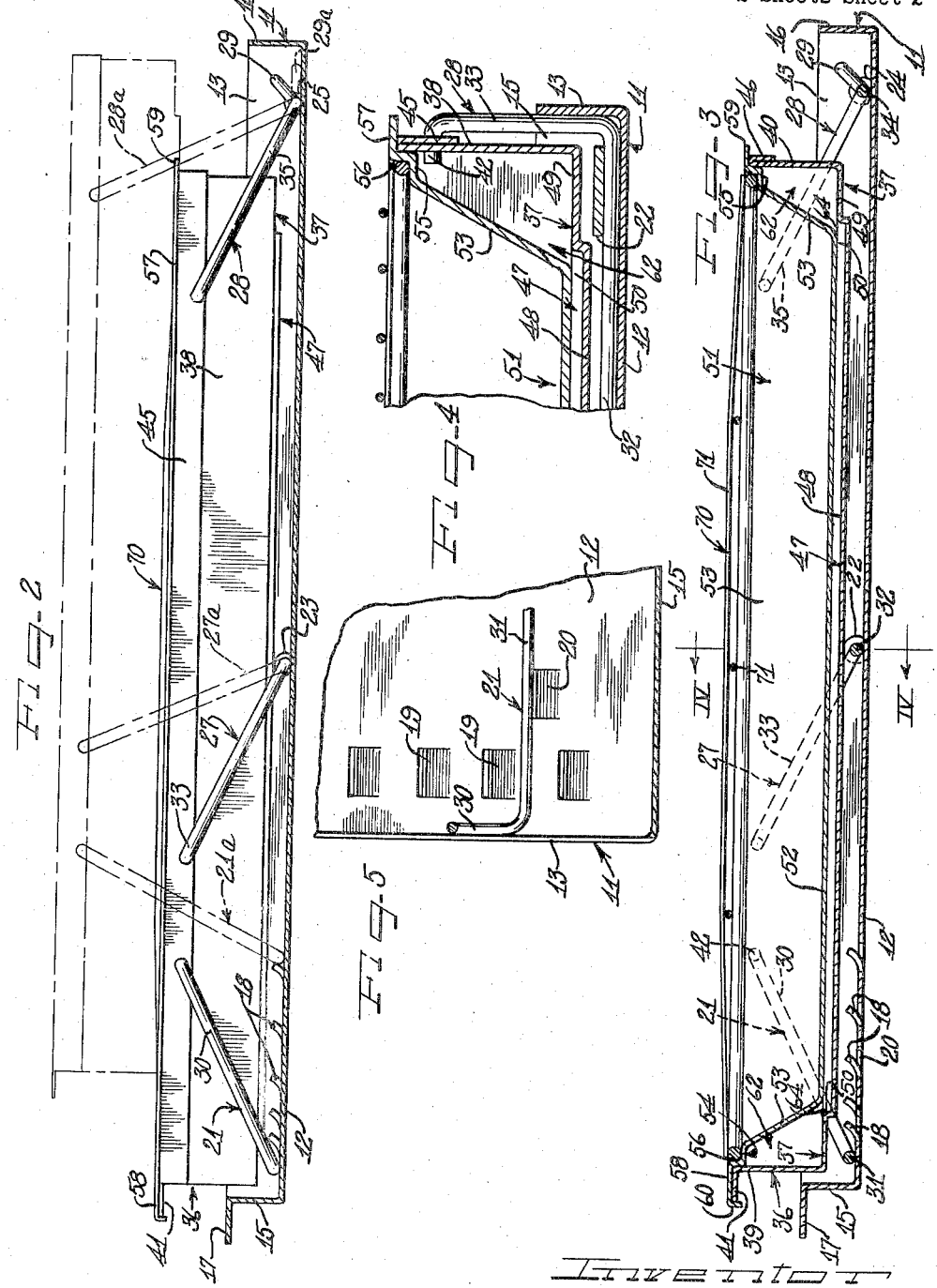

2,832,497
FOOD SUPPORTING MEANS
Jacob L. Shroyer, Sepulveda, Calif.
Application August 5, 1955, Serial No. 526,595
14 Claims. (Cl. 220—13)

This invention relates to a means for supporting food underneath a source of heat and particularly to such a means which is operative to completely prevent smoking or burning of grease during a broiling operation.

Heretofore the broiling of meat has been attended with the formation of smoke due to the burning of grease in the grease pan beneath the meat. Not only is the smoke objectionable, but further the burnt grease is difficult to remove during cleaning of the pan. The present invention contemplates a broiler pan structure for maintaining the entire bottom of the grease pan in contact with a liquid coolant medium and for automatically compensating for evaporation of the coolant medium to prevent burning of grease throughout the course of the broiling operation. An outstanding feature of the present invention is the provision of a storage space of predetermined adequate capacity above the bottom of the grease pan for automatically replenishing the coolant medium as the same is evaporated from the bottom coolant space beneath the grease pan bottom.

It is therefore an object of the invention to provide a food supporting means including a novel construction for preventing fats, greases and the like either derived from the food or applied from catching on fire and burning.

It is also an object of the invention to reduce the possibility of fat spattering to a minimum during cooking for added safety and cleanliness.

It is a further object of this invention to provide a food supporting means which is readily and easily cleaned.

In accordance with the objects of the invention, it is a feature to provide a water pan and a grease pan of novel cooperating configuration to maintain the grease pan bottom cooled by contact with water continuously during a normal cooking operation. The pans are nested to provide a storage space between the side walls thereof and a bottom coolant space between the bottoms thereof.

For offsetting evaporation during a normal broiling operation of between 15 and 30 minutes, it has been determined that the lower one-third of the storage space must have a capacity of at least .01 cup liquid measure per inch of top periphery of the outer pan side walls. When this criterion is fulfilled, it is found that the storage space will hold sufficient coolant medium to maintain the medium in contact with the entire bottom of the grease pan during a normal broiling operation of between 15 and 30 minutes while at the same time not requiring an initial level of the coolant medium in the storage space so high as to give rise to a danger of spillage thereof over the top edge of the outer pan during handling.

It is another object of the invention to provide simple and convenient means for raising and lowering food relative to a source of heat.

In accordance with this last object there is provided as a feature of this invention a novel base adapted to be formed from a single strip of sheet metal which mounts adjustable supporting arms for raising and lowering the food and provides for selective positioning of the arms.

It is still another object of the invention to provide a food supporting means which may be easily understood and utilized by the housewife.

Other and further important objects of this invention will be apparent from the disclosures in the specification and the accompanying drawings.

On the drawings:

Figure 1 is a top plan view of a food supporting means embodying the principles of my invention;

Figure 2 is a longitudinal sectional view taken substantially along the line II—II of Figure 1;

Figure 3 is a longitudinal sectional view taken substantially along the line III—III of Figure 1;

Figure 4 is a partial transverse sectional view taken substantially along the line IV—IV of Figure 3 showing an enlarged portion at the left side; and Figure 5 is a partial horizontal sectional view of the left front corner of the base with the front mounting arm in engagement with the second ear abutment from the front.

As shown on the drawings:

The reference numeral 10 (Figure 1) indicates generally a means for supporting food to be cooked underneath a source of heat (not shown). The food supporting means 10 may include a generally rectangular base 11 which for example, may be adapted to be mounted on a rack in the broiler oven of the conventional domestic range of the cabinet type. The base is preferably made from a single strip of sheet metal for ease of manufacture and has a rectangular bottom 12, left and right rectangular side walls 13 and 14, rectangular front wall 15 and rectangular rear wall 16. The front wall 15 of the base has an outwardly turned horizontal flange 17 extending forwardly for pushing and pulling the base into and out of an oven or the like, and also for holding the base stationary, if desired, while raising the other parts of the food supporting means relative thereto.

The bottom 12 has a plurality of longitudinally spaced ears or abutments struck upwardly from the front portion of the bottom at each side, the ears on the right side being indicated by the reference numeral 18 and the ears on the left side (Figure 5) being indicated by the reference numeral 19. The openings which thus remain in the bottom 12 of the base are indicated by the reference numeral 20. The corresponding ears on each side, that is, for example, the forwardmost ear 18 on the right side and the forwardmost ear 19 on the left side, are transversely aligned. As shown in Figure 5, these ears, which function as abutments for a U-shaped resilient mounting arm 21 at the forward end of the base, slope upwardly and rearwardly from the base in order to retain the mounting arm engaged therewith.

Also struck upwardly from the bottom 12 of the base at intermediate and rear portions thereof, on each side, are curled-over circular bearing members, the intermediate left and right bearing members being numbered 22 and 23 and the left and right rear bearing members being numbered 24 and 25, respectively. The openings remaining in the base bottom, at the rear end, are indicated by the reference numeral 26 (Figure 1). The circular bearing members mount intermediate and rear U-shaped resilient mounting arms 27 and 28. The mounting arms 21, 27, and 28 are preferably of identical interchangeable construction except for a C-bend 29 in the central portion of the mounting arm 28. The front mounting arm 21 comprises left and right legs 30 extending upwardly from a central body 31 which is the part of the mounting arm 21 which engages the ears 18 and 19. The intermediate mounting arm 27 has a central body 32 and upwardly extending legs 33, and the rear mounting arm 28 has a central body 34 in which the C-bend 29 is formed and upwardly extending legs 35.

These mounting arms are connected at their upper free ends to a sheet metal water pan 36 having a rectangular bottom 37 and rectangular vertically extending side walls 38, front wall 39 and rear wall 40. The front wall 39 has a horizontally outwardly extending flange 41 along the top edge thereof for gripping purposes. As best seen in Figure 4, the mounting arm legs have at their free ends inturned trunnions 42 engaged in circular openings extending through the reinforced top marginal edge portions of the side walls 38. The reinforced top marginal portions are formed, preferably, by reversely bending the top edges of the side walls to provide side reinforcing strips 45 and a rear reinforcing strip 46. The openings thus provide bearings for the mounting arm legs.

Since the openings and bearing members are equally spaced and since the legs 33 and 35 of the intermediate and rear mounting arms are of the same length, the legs form a parallelogram linkage, consequently when the arms are pivoted upwardly about the bearing members 22—25, they raise the water pan horizontally. The legs 30 on the front mounting arm are of the same length but are arranged to slope upwardly and rearwardly from the base rather than upwardly and forwardly therefrom. In any given position, therefore, the front legs extend at the same angle to the base, but in the opposite direction. The lowermost position of the water pan is slightly below that shown in solid outline in Figure 2. The uppermost position of the water pan is shown in dot-dash outline in Figure 2. In the uppermost position, the front mounting arm 21 will rest against the rearmost ears 18 and 19 and the arms will extend sharply upwardly, as indicated in dot-dash outline, the mounting arms in outline being designated 21a, 27a and 28a.

The water pan bottom has a rectangular well 47 spaced inwardly from the water pan side and end walls, the well having a rectangular bottom 48 spaced below the water pan bottom raised marginal portion 49 extending adjacent the water pan side and end walls. The well is illustrated as having vertically extending side and end walls 50 joining the water pan raised bottom portion 49 and the well bottom 48.

As best seen in Figures 3 and 4, a grease pan 51 having a rectangular bottom 52 approximately equal in length and width to the well bottom 48 and having outwardly sloping trapezoidal side and end walls 53 is adapted to nest within the water pan 36. At the upper marginal edges of the sloping trapezoidal side and end walls are step-like wall portions 54 comprising a horizontally extending ledge portion 55 extending outwardly from the top marginal edges of the side and end walls 53 and a vertically extending portion 56. Extending horizontally outwardly from the top margin of the vertically extending portion 56 are side flanges 57, front flange 58 and rear flange 59. The front grease pan flange 58 has a downturned lip 60 at the outer end thereof which engages around the outer edge of the water pan flange 41. As seen in Figure 4, the side flanges 57 project outwardly beyond the reinforcing strips 45 to facilitate the placing of the grease pan in nested relation to the water pan and removal of the grease pan from the water pan. Since the vertically extending ledge portions 56 are preferably substantially in contact with the side and end walls 38, 39, 40 of the water pan and since the side and end flanges 57, 58, 59, preferably rest on the top edges of the side and end walls of the water pan, including the reinforcing strips 45, 46 and the front flange 41, there is a large area of contact between the grease pan and the water pan at the nesting juncture of the nested pans to provide a substantially water-tight chamber or storage space generally indicated by the reference numeral 62 between the water pan and the grease pan.

In nesting position of the grease pan 51 within the water pan 36, the grease pan bottom wall 52 extends substantially coextensively with the bottom 48 of the well in spaced opposed relation, and the marginal edges of the bottom 52 extend in closely spaced relation to the inner marginal edges indicated by the reference numeral 64 of the water pan raised bottom portion 49. Thus, flow of water out of the well into the surrounding spaces is resisted when the grease pan is nested in the water pan to reduce the shifting of the water and the consequent forces on the water pan as the base is translated, as into a broiler oven, or as the water pan is pivoted upwardly above the base. Since the trapezoidal walls 53 of the grease pan slope outwardly from the bottom thereof, the storage space 62 is trapezoidal and extends around all four sides of the grease pan, being defined by the side walls 38, front wall 39 and rear wall 40 of the water pan, the water pan raised bottom portion 49 (which comprises a rectangular strip extending rectangularly about the four sides of the well and raised thereabove) and the trapezoidal side walls 53 of the grease pan and the horizontally extending ledge portion 55 of the grease pan (which is also a rectangular strip extending rectangularly around the upper margin of the side walls 53). The spacing between the water pan bottom portion edge 64 and the grease pan bottom affords communication between the storage space 62 and the well. The flat trapezoidal sides 53 make possible very convenient scraping of grease from the sides of the grease pan by the use of a rigid straight-edged scraper made of plastic or other suitable material.

It has been found in practice that if the space or chamber 62 is filled with sufficient water so that when the water pan and grease pan are in nested relation, the grease pan floats or tends to float in the water, and so that the storage space 62 between the sides of the pan is partly filled with water, the bottom surface of the inner grease pan will remain in contact with the water during a normal cooking operation, the storage space 62 supplying water to offset the loss of water due to evaporation. In practice, for example, the side walls 38, 39, 40 of the water pan and the side walls 53 of the grease pan may be of relative size and shape, so that one cup of water will fill the well and a second cup will amply supply the storage space, about one-half cup being evaporated during normal cooking operation.

A rectangular food rack 70 is adapted to fit snugly in the ledge 54, resting on the horizontal ledge portion 55 and against the vertically extending portion 56. It has been found in practice that if the food supporting wires 71 are sufficiently small in diameter, grease will tend to "pop" off the wires as it hardens. Heretofore wires for food racks have been generally of a diameter greater than about 0.093 inch. With wires of a diameter of less than this, the "popping" effect is very noticeable and facilitates cleaning of the food rack. Wires of less than 0.050 inch are generally unsuited for food racks.

The assembly and operation of the food supporting means will now be readily understood.

With the ears 18 and 19 struck out of the base 11 and the bearing members 22—25 struck out but not completely curled over, the intermediate and rear mounting arm bodies 32 and 34 are placed transversely on the bottom of the base and the bearing member curled over to form circular bearings for the bodies and to hold them in place on the base. The front mounting arm 21 can be pivotally connected to the front corresponding openings of the water pan by springing the legs 30 of the mounting arm apart sufficiently so that the trunnions 42 thereof can be placed around the sides 38 of the water pan and into the openings. The intermediate and rear mounting arms are then similarly connected, respectively, to the intermediate and rear corresponding openings in the water pan.

Preferably, the water pan is then supplied with water to a predetermined level as by supplying a certain number of cups of water, this being a familiar manner of measure for those engaged in cooking. When the grease pan is then placed in nested relation with the water pan, the water is effectively sealed against water leakage and the assembly can be carried about without danger of splashing water. Furthermore, the proximity of the grease pan bottom to the water pan raised bottom portion 49 materially reduces the flow of water due to its inertia while the assembly is being carried. Furthermore, a minimum of water is required because of the depressed well which is coextensive with the bottom of the grease pan. Only enough water need be supplied to the storage space 62 to offset the loss of the water due to evaporation in the well. Little or no water in the storage space 62 is required to initially establish the water in the well in contact with the grease pan. The water in the storage space 62, which is necessary, contacts the lowermost portions of the trapezoidal side walls 53 to aid in cooling the bottom 52 by conduction from the side walls. By maintaining the water in the well in contact with the bottom of the grease pan, an insulating layer of air between the grease pan bottom and the water is avoided and cooling of the grease pan is greatly enhanced.

Because of the converging configuration of the storage space, a given amount of water will reach a higher level in the storage space so that less water is required to compensate for possible slight tilting of the water pan during cooking. At the same time, the space converges upwardly so that the level is still substantially below the nesting juncture to prevent spillage. The vertical walls of the water pan also inhibit splashing of water during handling.

If, for example, meat is to be cooked, with the rack 70 in place and the food thereon, the entire food supporting means 10 illustrated can be inserted into a broiler oven or the like beneath a source of heat. If it is desired to first sear the meat, the water tray and food rack assembly can be raised to the uppermost position shown in dot-dash outline in Figure 2, with the C-bend 29 in contact with the bottom 12 of the base, as indicated by the reference numeral 29a in Figure 2. In this position it will be observed that the water pan assembly is still disposed over the base 11 but is spaced upwardly above the uppermost extent of the side walls of the base to afford access for a knife or the like between base front wall 15 and water pan bottom 37. After the searing of the meat has been accomplished on both sides, the water pan assembly and food rack can be lowered to a position such as is shown in solid outline in Figure 2 by inserting a long knife or similar object underneath the base 31 of the front mounting arm 21 between the ears 18 and 19, and prying upwardly. If desired, the lowering of the assembly, including the food rack 70, can be controlled as by guiding the flanges 41, 58. It is thus possible to conveniently lower the food rack without removing the food supporting means from the oven or the like or even inserting a hand into the oven.

It has been found in practice that because of the construction of the mounting arms, the base will not pivot downwardly at the forward end, as, for example, the whole assembly 10 is pulled from an oven by the flange 41—58—60, and the base is supported only at its rear portion.

There is thus provided a readily manufactured food supporting assembly which is rugged and adaptable and easily understood and used by the ordinary housewife. The water pan can be easily removed from the base by the housewife by simply springing outwardly the mounting arm legs one at a time. The base and water pan are readily cleaned by the usual household brushes and the like and there are no inaccessible crevices which make cleaning difficult. The grease pan is especially expeditiously cleaned. Furthermore, when the water cooling is employed, the possibility of spattering of fat as well as the burning of fat or grease, is minimized. The base and water pan therefore will be substantially free of grease, carbonized matter and the like.

The assembly is conveniently portable by the housewife and can therefore be carried to the kitchen sink for cleaning, the base and water pan or other pan support included. The assembly is of such size and shape and of such construction that the assembly can be readily inserted into and readily removed from any conventional range oven of the type having a rack which may be mounted in the oven. Therefore, the assembly can be advantageously mass produced in a single size.

The advantageous cleaning of the grease pan and other parts would have less appeal to the housewife if a food rack which was difficult to clean was provided with the assembly. The novel grease-shedding food rack 70 of the present invention therefore greatly increases the desirability of the entire assembly. The rack 70 having widely spaced small diameter wires would not be practical on a food supporting assembly which was not continuously cooled during a cooking operation by contact of water with the bottom of the grease pan, since the rack would be insufficient to shield the grease in the grease pan from the source of heat. There is, therefore, a novel and unique cooperation between the size and shape of the nesting pans which provides sufficient storage space for water to offset evaporation and maintain contact of water with the bottom of the grease pan and the food rack of small diameter wire.

It will be understood that the size and shape of the nesting pans is such that with for example two cups of water in the outer pan which for the particular construction illustrated is sufficient to offset evaporation, and also to compensate for normal tilting of the pan from the level position during cooking, the water will initially reach a level in the storage space when the pans are nested which is substantially below the nesting juncture of the nested pans to offset the tendency to lose water due to normal tilting from level position of the nested pans during a cooking operation and to reduce the tendency for spillage of water during handling.

By way of an actual physical example of a nested pan construction according to the present invention, where the outer pan is 10 inches wide, 14 inches long, and 1⅜ inches deep, the bottom coolant space between the bottom 48 of the outer pan and the bottom 52 of the inner pan may be 8¼ inches wide, 12¼ inches long and .09 inch deep, and have a volume of 9.1 cubic inches or .62 cup. The capacity of the lower one-third of the storage space may be about 1.1 cups and thus substantially greater than the capacity of the bottom coolant space.

By way of example of preferred embodiments of the present invention, for an outer pan having a perimeter at the top of the side walls of 32 inches and a storage space 1⅜ inches in height, the capacity of the storage space between a level just above the bottom coolant space and a level ⅓ the height of the storage space thereabove is preferably equal to .77 cup, or .024 cup per inch of top periphery of the outer pan side walls. For a top perimeter of the outer pan side walls of 48 inches and a storage space height of 1⅜ inches, the capacity of the storage space between the level of the top of the bottom coolant space and a level ⅓ the height of the storage space thereabove is preferably 1.2 cups or .025 cup per inch of top perimeter of the outer pan side walls. For a top perimeter of the outer pan side walls of 72 inches, the capacity of a storage space 1⅜ inches deep between a level at the top of the bottom coolant space and a level ⅓ the height of the storage space thereabove is preferably 1.86 cups or a ratio of .026 cup per inch of top periphery of the outer pan side walls.

It has been found that the capacity of the lower one-third of the storage space must be at least .01 cup liquid measure per inch of top periphery of the outer pan side walls to enable the storage space to contain sufficient water to offset evaporation during normal broiling operations without danger of spillage of water from the storage space during handling. In order to maintain water in contact with the bottom of the grease pan over the full range of temperatures and durations of broiling operations encountered in practice, even though the pans may be slightly tilted in the oven, it is preferred that the lower one-third of the storage space have a capacity of at least about .02 cup per inch of top periphery of the outer pan side walls. Preferably, also the capacity of the bottom coolant space is small in comparison to the volume of the storage space to minimize the quantity of water required in the water pan to establish the desired height in the storage space when the pans are nested.

The present application is a continuation-in-part of my copending application Serial No. 243,986, filed August 28, 1951 and now abandoned.

It will be understood that modifications and variations may be effected without departing from the scope of the novel concepts of the present invention.

I claim as my invention:

1. In a means for supporting food to be cooked underneath a source of heat, an outer pan having an imperforate bottom, an inner pan nested within said outer pan and having an imperforate bottom spaced above the bottom of said outer pan to define a bottom coolant space therebetween, said outer and inner pans having side walls of cooperating configuration defining a coolant storage space therebetween above and in communication with said bottom coolant space, said bottom of said inner pan extending continuously over the entire area between the lower edges of the side walls of said inner pan, said pans being constructed to receive a liquid coolant medium in said bottom coolant space in contact with the bottom of said inner pan over the entire area thereof and reaching a level in said storage space between the side walls which is a substantial height above the top of said bottom coolant space but substantially spaced below the top of said storage space to avoid the danger of spillage, the lower one-third of said storage space having a capacity of at least .01 cup liquid measure per inch of top periphery of the outer pan side walls.

2. In a means for supporting food to be cooked underneath a source of heat, an outer pan having an imperforate bottom, an inner pan nested within said outer pan and having an imperforate bottom spaced above the bottom of said outer pan to define a bottom coolant space therebetween, said outer and inner pans having side walls of cooperating configuration defining a coolant storage space therebetween above and in communication with bottom coolant space, said bottom of said inner pan extending continuously over the entire area between the lower edges of the side walls of said inner pan, and a liquid coolant medium in said bottom coolant space in contact with the bottom of the inner pan over the entire area thereof between the lower edges of the side walls thereof and reaching a level in said storage space between the side walls which is a substantial height above the top of said bottom coolant space but substantially spaced below the top of the outer pan side walls to avoid the danger of spillage.

3. In a means for supporting food to be cooked underneath a source of heat, an outer pan having an imperforate bottom, an inner pan nested within said outer pan and having an imperforate bottom spaced above the bottom of said outer pan to define a bottom coolant space therebetween, said outer and inner pans having side walls of cooperating configuration defining a coolant storage space therebetween above and in communication with bottom coolant space, said bottom of said inner pan extending continuously over the entire area between the lower edges of the side walls of said inner pan, and a liquid coolant medium in said bottom coolant space in contact with the bottom of the inner pan over the entire area thereof between the lower edges of the side walls thereof and reaching a level in said storage space between the side walls which is a substantial height above the top of said bottom coolant space but substantially spaced below the top of the outer pan side walls to avoid the danger of spillage, the volume of said liquid coolant medium in said storage space above the top of the bottom coolant space being at least .01 cup liquid measure per inch of top periphery of the outer pan side walls.

4. In a means for supporting food to be cooked underneath a source of meat, an outer pan having an imperforate bottom, an inner pan nested within said outer pan and having an imperforate bottom spaced above the bottom of said outer pan to define a bottom coolant space therebetween, said outer and inner pans having side walls of cooperating configuration defining a coolant storage space therebetween above and in communication with bottom coolant space, said bottom of said inner pan extending continuously over the entire area between the lower edges of the side walls of said inner pan, and a liquid medium in said bottom coolant space in contact with the bottom of the inner pan over the entire area thereof between the lower edges of the side walls thereof and reaching a level in said storage space between the side walls which is a substantial height above the top of said bottom coolant space but subspaced below the top of the outer pan side walls to avoid the danger of spillage, the volume of said liquid coolant medium in said storage space between the side walls being initially at least equal to the volume of said liquid coolant medium in said bottom coolant space.

5. In a means for supporting food to be cooked underneath a source of heat, an outer pan having an imperforate bottom, an inner pan nested within said outer pan and having an imperforate bottom spaced above the bottom of said outer pan to define a bottom coolant space therebetween, said outer and inner pans having side walls of cooperating configuration defining a coolant storage space therebetween above and in communication with said bottom colant space, said bottom of said inner pan extending continuously over the entire area between the lower edges of the side walls of said inner pan, said pans being constructed to receive a liquid coolant medium in said bottom coolant space in contact with the bottom of said inner pan over the entire area thereof and reaching a level in said storage space between the side walls which is a substantial height above the top of said bottom coolant space but substantially spaced below the top of said outer pan side walls to avoid the danger of spillage, the volume of said storage space above the top of said bottom coolant space being at least equal to the volume of said bottom coolant space, and the volume of said storage space up to a level substantially spaced below the top of said storage space being at least one-half cup.

6. In a means for supporting food to be cooked underneath a source of heat, an outer pan having an imperforate bottom, an inner pan nested within said outer pan and having an imperforate bottom spaced above the bottom of said outer pan to define a bottom coolant space therebetween, said outer and inner pans having side walls of cooperating configuration defining a coolant storage space therebetween above and in communication with said bottom coolant space, said pans being constructed to receive a liquid coolant medium in said bottom coolant space in contact with the bottom of said inner pan over the entire area thereof and reaching a level in said storage space between the side walls which is a substantial height above the top of said bottom coolant space to provide a volume of liquid in said storage space sufficient to offset evaporation during normal broiling operations with said pans and thereby to maintain the entire area of the bottom of the inner pan continuously between the lower edges of the side walls of the inner pan in contact with the coolant medium during the entire broiling operation.

7. In a means for supporting food to be cooked underneath a source of heat, an outer pan having an imperforate bottom, an inner pan nested within said outer pan and having an imperforate bottom spaced above the bottom of said outer pan to define a bottom coolant space therebetween, said outer and inner pans having side walls of cooperating configuration defining a coolant storage space therebetween above and in communication with said bottom coolant space, said pans being constructed to receive a liquid coolant medium in said bottom coolant space in contact with the bottom of said inner pan over the entire area thereof and reaching a level in said storage space between the side walls which is a substantial height above the top of said bottom coolant space to provide a volume of liquid in said storage space sufficient to offset evaporation during normal broiling operations with said pans and thereby to maintain the entire area of the bottom of the inner pan continuously between the lower edges of the side walls of the inner pan in contact with the coolant medium during the entire broiling operation, the volume of said storage space between the side walls and above the top of the bottom coolant space being substantially larger than the volume of said bottom coolant space.

8. In combination in a means for supporting food to be cooked underneath a source of heat, a sheet metal base having a rectangular bottom and rectangular side, front and rear walls, said base bottom having a plurality of longitudinally spaced ears struck upwardly from the front portion thereof at each side, corresponding ears on each side being transversely aligned, said base bottom having curled-over circular bearing members struck upwardly from the intermediate and rear portions of said base bottom at each side thereof and in transverse alignment, intermediate and rear U-shaped resilient mounting arms of circular cross-section having elongated bodies extending transversely across the base bottom and pivotally mounted in said circular bearing members and having legs extending upwardly at each end of each of the bodies, said rear mounting arm body having a C-bend formed centrally therein, the plane of said bend being at an angle to the plane of the rear mounting arm legs to limit upward pivotal movement of the legs about the rear bearing members, a sheet metal water pan having a rectangular bottom of length substantially less than the length of said base and rectangular side and end walls, the water pan side walls having circular openings adjacent the top thereof at the rear, at an intermediate position and at the front, the corresponding openings on each side being transversely aligned, the rear and intermediate U-shaped mounting arms having inturned trunnions at the free ends of the legs thereof for pivotal engagement in respectively the rear and intermediate corresponding openings of said water pan side walls, a front U-shaped resilient mounting arm having inturned trunnions at the free ends thereof for pivotal engagement with the front corresponding openings and having a body for selective engagement with corresponding ears of said base, said water pan bottom having a rectangular well spaced inwardly from the water pan side and end walls, said well having vertically extending rectangular side and end walls of height substantially less than the height of the water pan side and end walls and having a rectangular bottom, a grease pan for nesting mounting within said water pan having a rectangular bottom substantially equal in length and width to the water pan rectangular well bottom and adapted to be mounted in closely spaced coextensive relation to the well side and end walls, said grease pan having trapezoidal side walls sloping outwardly from said grease pan rectangular bottom and a step-like wall portion including a horizontal ledge portion extending outwardly around the top margin of the sloping trapezoidal sides and a vertical wall portion extending vertically upwardly from the outer margin of the horizontal ledge portion, said grease pan having a flange extending horizontally outwardly from the upper margin of said vertical wall portion around the rectangular periphery having an outer length and width substantially equal to the length and width of the water pan bottom whereby the flange will overlie the side and end walls of the water pan and the vertical wall portion will be in close relation to the side and end walls of the water pan when the pans are nested, the flange and vertical wall portion preventing escape of water from the water pan, and a rectangular food rack of length and width corresponding to the outer length and width of the horizontal ledge portion for mounting thereon, the front, intermediate and rear mounting arm legs being identical and the intermediate and rear bearing members and openings being equally spaced to form a parallelogram linkage to maintain the water pan bottom substantially parallel to the base bottom, the rear intermediate arms pivoting from a lower forwardly sloping position with the water pan bottom below the top of the base side and end walls to a more sharply upwardly forwardly sloping position with the water pan bottom spaced upwardly from the top of the base side and end walls before the C-bend in the rear arm contacts the bottom of the base, the length of the base being such that the water pan is over the base in the sharply upwardly forwardly sloping position as well as in the lower position.

9. In combination in a means for supporting food to be cooked underneath a source of heat, a sheet metal base, said base having a plurality of longitudinally spaced ears struck upwardly from the front portion thereof, said base having curled-over circular bearing members struck upwardly from the intermediate and rear portions thereof, intermediate and rear U-shaped resilient mounting arms of circular cross-section having elongated bodies extending transversely across the base and pivotally mounted in said circular bearing members and having legs extending upwardly at each end of each of the bodies, a sheet metal water pan having a rectangular bottom and rectangular side and end walls, the water pan side walls having circular openings adjacent the top at the rear, at an intermediate position and at the front, the corresponding openings on each side being transversely aligned, the rear and intermediate U-shaped mounting arms having inturned trunnions at the free ends of the legs thereof for pivotal engagement in respectively the rear and intermediate corresponding openings of said water pan side walls, a front U-shaped resilient mounting arm having inturned trunnions at the free ends thereof for pivotal engagement with the front corresponding openings and having a body for selective engagement with the ears of said base, said water pan bottom having a rectangular well spaced inwardly from the water pan side and end walls, said well having vertically extending rectangular side and end walls of height substantially less than the height of the water pan side and end walls and having a rectangular bottom, a grease pan for nesting mounting within said water pan having a rectangular bottom substantially equal in length and width to the water pan rectangular well bottom and adapted to be mounted in closely spaced coextensive relation to the well side and end walls, said grease pan having trapezoidal side walls sloping outwardly from said grease pan rectangular bottom, the front, intermediate and rear mounting arm legs being identical and the intermediate and rear bearing members and openings being substantially equally spaced to form a parallelogram linkage to maintain the water pan bottom substantially parallel to the base, the rear and intermediate arms pivoting from a lower forwardly sloping position to a more sharply upwardly forwardly sloping position.

10. In combination in a means for supporting food to be cooked underneath a source of heat, a sheet metal base, said base having a plurality of longitudinally spaced abutments connected to the front portion thereof, said base having curled-over bearing members struck upwardly from the intermediate and rear portions thereof, intermediate and rear U-shaped mounting arms having elongated bodies extending transversely across the base bottom and pivotally mounted in said bearing members and having legs extending upwardly at each end of each of the bodies, a sheet metal water pan having a bottom and side and end walls, the water pan side walls having bearings adjacent the top at the rear, at an intermediate position and at the front, the rear and intermediate U-shaped mounting arm legs pivotally engaging in respectively the rear and intermediate water pan bearings, a front U-shaped mounting arm having legs pivotally engaging in the front water pan bearings and having a body for selective engagement with the base abutments, said water pan bottom having a rectangular well spaced inwardly from the water pan side and end walls, said well having vertically extending rectangular side and end walls of height substantially less than the height of the water pan side and end walls and a rectangular bottom, a grease pan for nesting mounting within said water pan having a rectangular bottom corresponding in size and shape to the water pan rectangular well bottom and adapted to be mounted in spaced coextensive relation to the well bottom, said grease pan having sides sloping outwardly from said grease pan rectangular bottom to define with the water pan walls, when the pans are nested, a storage space for water in communication with said well.

11. In combination in a means for supporting food to be cooked underneath a source of heat, a base, a water pan having a bottom and side and end walls, means pivotally connected to said base and to said water pan for pivotal raising of said water pan above said base, means for releasably retaining said water pan in raised position, said water pan bottom having a well spaced inwardly from the water pan side and end walls, said well having side and end walls of height substantially less than the height of the water pan side and end walls and a bottom, a grease pan for nesting mounting within said water pan having an imperforate bottom corresponding in size and shape to the water pan well bottom and adapted to be mounted in spaced substantially coextensive relation to the well bottom, said grease pan having side walls sloping outwardly from said grease pan bottom to define with the water pan walls, when the pans are nested, a storage space for water in communication with said well.

12. In combination in a means for supporting food to be cooked underneath a source of heat, a sheet metal base, said base having a plurality of longitudinally spaced ears struck upwardly from the front portion thereof, said base having curled-over circular bearing members struck upwardly from the intermediate and rear portions thereof, intermediate and rear U-shaped flexible mounting arms of circular cross-section having elongated bodies extending transversely across the base and pivotally mounted in said circular bearing members and having legs extending upwardly at each end of each of the bodies, a generally rectangular water pan having side and end walls, the water pan side walls having circular openings therein at the rear, at an intermediate position and at the front, the corresponding openings on each side being transversely aligned, the rear and intermediate U-shaped mounting arms having inturned trunnions at the free ends of the legs thereof for pivotal engagement in respectively the rear and intermediate corresponding openings of said water pan side walls, and a front U-shaped flexible mounting arm having inturned trunnions at the free ends thereof for piotal engagement with the front corresponding openings and having a body for selective engagement with the ears of said base, the front intermediate and rear mounting arm legs being identical and the intermediate and rear bearing members and opening being substantially equally spaced to form a parallelogram linkage to maintain the water pan substantially parallel to the base.

13. In combination in a means for supporting food to be cooked underneath a source of heat, an elongated base having a plurality of longitudinally spaced ears struck upwardly from the front portion thereof and having longitudinally spaced curled-over circular bearing members struck upwardly from said bottom, mounting arms of circular cross-section pivotally mounted in said circular bearing members, a pan, means connected to said pan for pivotal connection of the mounting arms to the pan for pivotal movement of said pan relative to and above said base, a further arm, means connected to said pan for pivotal connection of said further arm to said pan, said further arm having a transversely extending body portion for selective engagement with said ears for retaining said pan above said base, said base and pan when connected by the mounting arms being conveniently portable.

14. In combination in a means for supporting food to be cooked underneath a source of heat, a conveniently portable base having a plurality of longitudinally spaced ears projecting upwardly from the front portion thereof and having longitudinally spaced bearing members projecting upwardly from said bottom, mounting arms pivotally mounted in said bearing members, a pan support, means connected to said pan support for pivotal connection of the mounting arms to the pan support for pivotal movement of said pan support relative to and above said base, a further arm, means connected to said pan support for pivotal connection of said further arm to said pan support, said further arm having a transversely extending body portion for selective engagement with said ears for retaining said pan support above said base, said base and pan support when connected by the mounting arms being conveniently portable.

References Cited in the file of this patent

UNITED STATES PATENTS

| Re. 11,451 | Stroud | Oct. 30, 1894 |
| 681,406 | Chauous | Aug. 27, 1901 |
| 693,725 | Leland | Feb. 18, 1902 |
| 1,650,639 | Lutzler | Nov. 29, 1927 |
| 2,300,837 | Ames | Nov. 3, 1942 |